Patented Sept. 25, 1928.

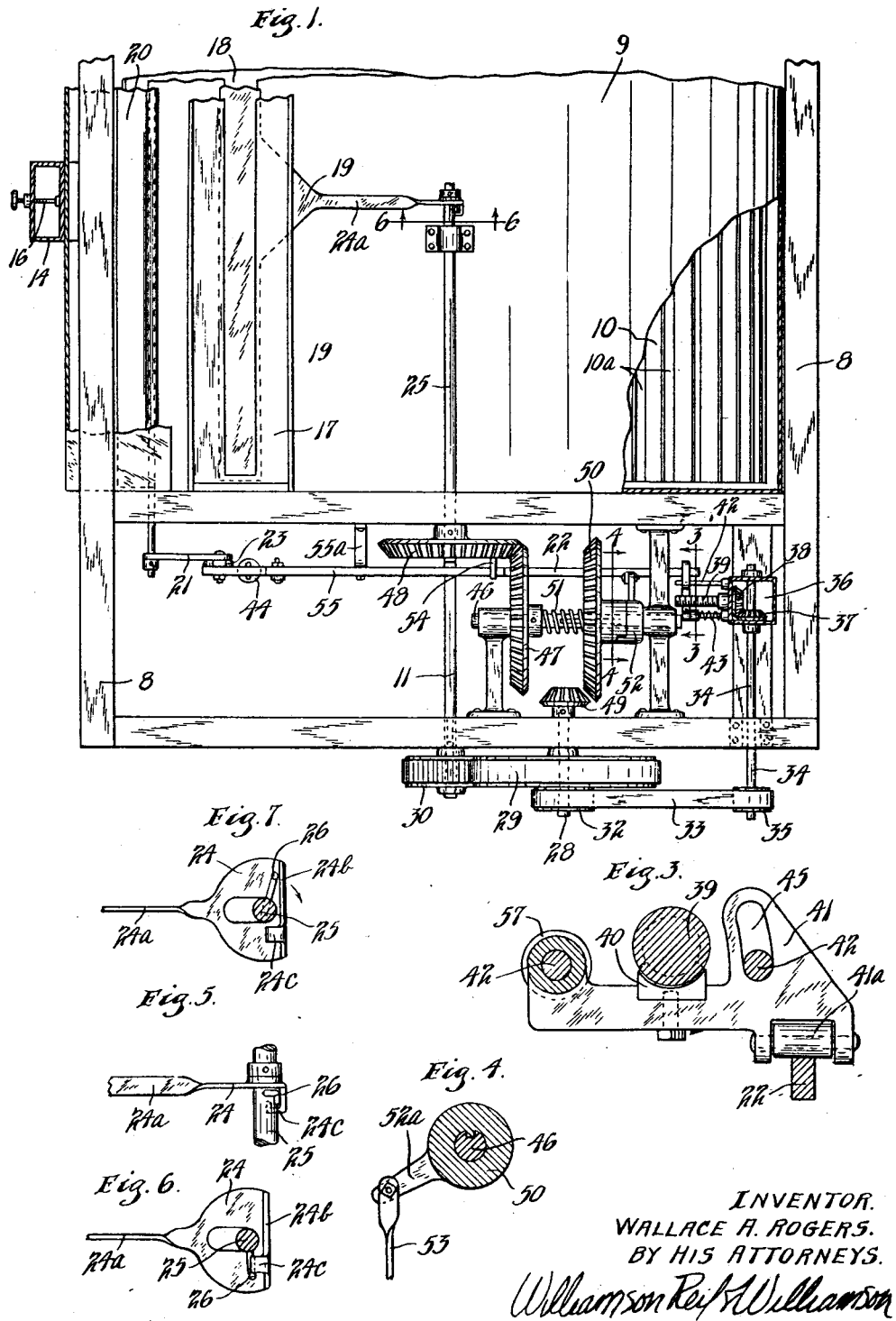

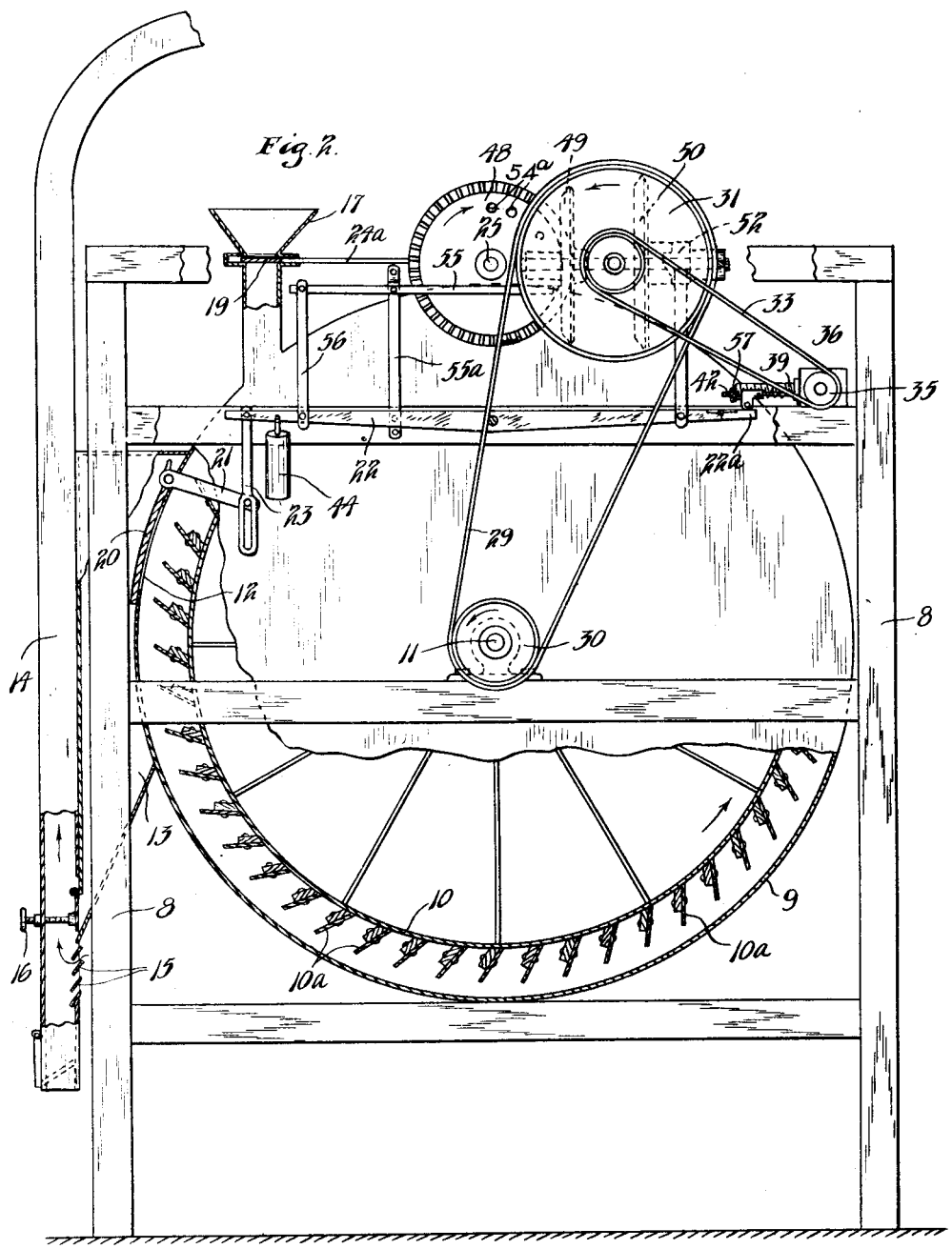

1,685,179

UNITED STATES PATENT OFFICE.

WALLACE A. ROGERS, OF ANOKA, MINNESOTA.

MACHINE FOR TREATING GRAIN.

Application filed May 26, 1926. Serial No. 111,750.

This invention relates to grain treating machines and especially to machines and apparatus for scouring, polishing, shelling and cleaning grain.

In most machines of this class commercially used at this time, the feeding and discharge of material is irregular often causing the treating chamber to be overcharged or undercharged. The result is that the grain is not treated uniformly, and the machinery is subjected to considerable wear and strain and cannot operate at full capacity.

Another objection to most types of grain treating machines is that the material to be treated is delivered adjacent one end of the machine and has to be distributed uniformly throughout the machine by means of the scouring cylinder or other moving parts consequently subjecting these parts adjacent the material intake to considerable wear and moreover slowing down the operation of the machine to some degree, since the material must be evenly distributed throughout the scouring or treating chamber before the same may be abrasively treated.

The main object of my invention is to provide a highly efficient improved grain treating machine which will positively regulate the feeding of material into the treating chamber and the discharge therefrom, and will cause a definite charge of material to be treated for a determined period of time.

Another object is to provide means for varying the length of time during which the material is treated, as desired.

A further object is to provide in such a device actuating mechanism for alternately controlling the admission and the discharge of material to and from the treating chamber, and timing mechanism for causing said actuating mechanism to operate intermittently.

A still further object of the invention is to provide means for causing the material to be uniformly admitted to the treating chamber in a thin sheet extending the full length thereof, and to cause treated material to be discharged in the same manner.

These and other objects of the invention will be disclosed in the following description made in connection with the accompanying drawings and in which:

Fig. 1 is a plan view of a preferred embodiment of my invention.

Fig. 2 is an elevation of the same with some parts broken away.

Fig. 3 is a cross section taken on the line 3—3 of Fig. 1 showing the carriage for controlling the timing mechanism.

Fig. 4 is a cross section on a larger scale taken on the line 4—4 of Fig. 1 showing the clutch operating means for controlling the movement of the feed gate.

Fig. 5 is a plan view of the feed gate actuating mechanism.

Fig. 6 is a cross section taken on the line 6—6 of Fig. 1 and

Fig. 7 is a cross section similar to Fig. 6 showing said mechanism in position to open the feed gate.

My device in a general way comprises actuating mechanism for quickly opening and closing the discharge gate in the treating chamber and immediately thereafter opening and closing the feed gate; timing mechanism for setting said actuating mechanism in operation at predetermined intervals and mechanism for resetting said actuating mechanism.

In the preferred form of my invention illustrated a suitable upright frame 8 is provided having mounted therein a horizontally disposed treating or scouring casing 9. This may be of any desired construction according to the needs of the machine. A scouring cylinder 10 is mounted concentrically within scouring casing 9 on a horizontal shaft 11 suitably journaled in frame 8. Scouring cylinder 10 is provided with a multiplicity of parallel spaced blades or beaters 10ª extending longitudinally thereof and tilted with respect to the outer surface of cylinder 10.

The scouring casing 9 is provided preferably at its front side with an elongated relatively narrow delivery passage 12 extending horizontally across the entire length thereof. Passage 12 may communicate with a delivery hopper or chamber 13 delivering at its lower end to the suction leg or aspirator 14. Aspirator 14 is connected to a suction fan (not shown) and causes a swift current of air to be drawn through the treated material as it is discharged and dropped down a series of inclined shutters 15 below the delivery end of hopper 13. The discharge of grain from hopper 13 is adjusted by means of the regulating feeder 16.

The material is admitted to chamber 9 through a feed box 17 extending horizontally across the entire length of the upper portion of the scouring chamber and communicating at its lower narrowed end with a narrow intake passage 18, preferably in the top of casing 9. The admission of grain to the treating chamber is effected by means of an elongated feed gate 19 mounted for horizontal reciprocating movement across the intake passage 18.

The discharge of treated material is effected by means of an elongated discharge gate or flap 20, hinged over discharge passage 12. A lever arm 21 is rigidly secured to one of the pivot members of discharge gate 20.

An elongated lever 22 is pivoted at a convenient point on frame 8 operative to actuate gate 20 and to also set in operation the actuating mechanism for the feed gate. Lever 22 is pivotally connected to lever arm 21 by means of a link 23 having a slotted portion in the lower end thereof, the purpose of which will later be described.

Feed gate 19 is reciprocated by cam mechanism illustrated in Figs. 1, 5, 6 and 7. A horizontal operating shaft 25 is suitably journaled in the top of frame 8 extending longitudinally of the treating chamber and terminating at its inner end at a point transversely alined with the center of gate 19. A relatively small crank arm 26 is rigidly secured adjacent the inner end of said shaft and is adapted to engage a pair of vertical profile cams 24$^b$ and 24$^c$ respectively carried by the vertically disposed plate 24 which is connected by a tongue 24$^a$ to the central portion of gate 19.

It will be seen from the drawings, see Figs. 6 and 7, that cam 24$^b$ is adapted to be engaged by crank arm 26 to move gate 19 inwardly of the machine and open the same, while the short cam 24$^c$ will be engaged when crank arm 26 has passed horizontal position and is approaching the downward and vertical position causing door 19 to be closed. It will also be observed that for one half a revolution, that is after crank arm 26 has slipped out from engagement with cam 24$^c$ crank arm 26 will be idle and the gate 19 will be stationary. The feed gate is thus opened and closed during one half a revolution of shaft 25, while the discharge gate 20 is opened and shut during the other half revolution of said shaft.

An efficient adjustable timing mechanism is provided for intermittently causing lever 22 to swing downwardly and also causing shaft 25 to be rotated slowly through a single revolution. In this timing mechanism a stub shaft 28 is driven preferably by a belt or chain 29 from a pulley 30 preferably secured to the outer end of scouring cylinder shaft 11. The driven pulley 31 secured to shaft 28 is preferably of approximately three times the diameter of pulley 30 to give the necessary reduction in the speed of shaft 28. Shaft 28 rigidly carries adjacent its outer end a relatively small pulley 32 connected by belt 33 to drive a horizontal shaft 34 suitably journaled at the top of frame 8 and disposed parallel to shaft 11. The inner end of shaft 34 is journaled in a gear case 36 mounted on the top of frame 8 and has keyed thereto a relatively small bevel gear 37 in constant mesh with a similarly sized bevel gear 38 secured to the inner end of a worm 39 disposed transversely of shaft 34. Worm 39 is journaled for revolution in one side of gear casing 38 and is adapted to normally engage the upper side of a threaded segment 40 secured to a carriage head 41 slidably mounted on a pair of horizontally disposed rods or standards 42, which are shown as rigidly secured to a side of gear casing 36. A coiled spring 43 returns carriage head 41 to normal outward or extended position on the rods 42 when the threaded engagement between worm 39 and segment 40 is broken. A roller 41$^a$ is journaled in the lower portion of carriage head 41 vertically alined therewith, and adapted to engage the upper edge of the adjacent end of lever 22 to retain said lever in approximately horizontal position until worm 39 causes carriage head 41 to be moved inwardly out of engagement with said lever, whereupon the weight 44 fixed to the opposite end of lever 22 causes said lever to swing, thereby forcing arm 21 downwardly and opening discharge flap 20. An arcuate slot 45 is formed adjacent one end of carriage head 41 adapted to permit the carriage head to swing downwardly on one of the rods 42 thereby disengaging segment 40 from worm 39 and permitting coiled spring 43 to return the carriage head to normal extended position.

Actuating mechanism for revolving shaft 25 through a single revolution and for resetting lever 22 in normal position is provided as follows: A transversely disposed shaft 46 is suitably journaled in bearings provided on the top of frame 8 extending between shafts 11 and 34. Shaft 46 is at all times connected for driving shaft 25 by meshed bevel gears 47 and 48, disposed respectively on said shafts. A relatively small bevel pinion 49 is rigidly secured to the inner extended end of shaft 28 in position to be engaged by a bevel gear 50 of similar diameter to gears 47 and 48. Bevel gear 50 is slidably keyed to shaft 46 and is moved inwardly against coiled spring 51 to mesh with pinion 49 by means of a single tooth clutch 52 mounted on shaft 46. Clutch 52 is operated by means of a link 53 pivotally connected at its lower end to lever 22 and pivotally connected at its upper end to a clutch arm 52$^a$. Thus when lever 22 is released bevel gear 50 will be driven by pinion 49 through a single revolution, whereupon spring 51 will cause the same to drop back in normal disengaged position.

To reset lever 22 I provide a relatively short lever 55 pivoted to a standard 55$^a$ preferably vertically alined with lever 22. The outer end of lever 55 is connected by a link 56 to the weighted end of lever 22, while the inner end of lever 55 is engaged during approximately one half of the revolution of shaft 25 by a crank pin 54 on the outer face of bevel gear 48. The slotted lower portion of link 23 permits lever 22 to be swung past normal position to be reset when crank pin 54 is disengaged from lever 55. The retained end of lever 22 is provided with a hinged extremity 22ª adapted to swing under carriage head 41 whereby the device may be reset.

To adjust the timing mechanism I provide a lock nut 57 on the outer end of one of the rods 42. By changing the position of this lock nut the extended position of carriage head 41 is varied.

*Operation.*

The operation of the above described device may be briefly summarized as follows: Assuming the several mechanisms in the various positions illustrated in the drawings with the cam mechanism for reciprocating the feed gate in position as shown in Fig. 6, worm 39 will be continuously revolved causing carriage head 41 to be drawn inwardly thereby releasing the lever 22. As lever 22 is swung by the weight 44, the discharge gate 20 is opened for a short period of time and the actuating mechanism is simultaneously put in operation by the movement of clutch 52 causing bevel gear 50 to mesh with bevel pinion 49. The actuating mechanism, including bevel gears 47 and 48 and shaft 25 will be revolved through one complete revolution before clutch 52 slips back in normal position.

Lever 22 being swung disengages worm 39 from the threaded segment on the carriage head permitting the carriage head to be extended outwardly through the force of coiled spring 43. The resetting lever 55 is engaged by the crank pin 54 in the first half of the revolution of shaft 25 causing lever 22 to be slowly swung backwardly and resetting the hinged end 22ª which slips past the outer end of carriage head 41. The tripping or resetting of lever 22 requires one half of a revolution and the reciprocating of feed gate 19 is effected in the remaining half of the revolution of shaft 25. Thus, the scouring or treating chamber is emptied in the first half of the revolution and refilled in the second half of the revolution, whereafter the scouring cylinder 10 will treat the grain through a predetermined period until the timing mechanism again trips lever 22. By adjusting set screw 57 it will be seen that the time of treatment may be varied, or in other words, that the distance required to disengage carriage head 41 from lever 22 may be varied.

It will be seen that grain is discharged from, and admitted to the scouring chamber through elongated narrow passages extending the full length of the chamber. The grain may be admitted and discharged evenly in a thin sheet and will not collect at one end of the cylinder.

My aspiration of the treated grain is different than other forms of apparatus of this class in that I introduce air through the shutters 15 as the grain is dropping thereon. In this way the dust chaff and fine material is driven off by a blast of air passing through the dropping particles. Other aspirating devices cause a draft of air from the bottom of the leg 14 directly upwardly.

To vary the relative timing of the feed and discharge gates the position of pin 54 may be varied on the face of bevel gear 48, by securing the same in one of several threaded sockets 54ª.

From the foregoing description it will be seen that I have invented a highly efficient grain treating machine capable of positively controlling the admission and discharge of a definite amount of material to and from the treating chamber, as well as providing means for distributing the entering material evenly throughout the entire length of the chamber and discharging the treated material in the same manner.

It will of course be understood that various changes may be made in the form, details, proportions and arrangement of parts without departing from the scope of the invention.

What is claimed is:

1. A machine for the treatment of grain and the like, having in combination a treating chamber, an intake passage and a discharge passage communicating therewith, gates adapted to control the flow of material through said passages, actuating mechanism adapted to alternately control the movements of said gates, means for connecting said actuating mechanism to a source of power and timing mechanism comprising a rectilinearly movable retaining member adapted to normally engage said means and means for reciprocating said retaining member whereby said first mentioned means will be periodically released.

2. The structure set forth in claim 1, and a worm connected to a source of power and adapted to move said retaining means.

3. A machine for the treatment of grain and the like, having in combination a treating chamber, an intake passage and a discharge passage communicating with said chamber, a gate in each of said passages adapted to control the flow of material therethrough, actuating mechanism adapted to alternately control the movements of said gates, an operating lever for connecting said actuating mechanism to a source of power, means for normally causing said lever to swing when released, and timing mechanism comprising a rectilinearly movable retaining member adapted to normally engage one end of said lever and means for moving said retaining member whereby said lever will be periodically released.

4. A machine for the treatment of grain and the like, having in combination a treating chamber, an intake passage and a discharge passage communicating with said chamber, a gate in said passage adapted to control the flow of material therethrough, actuating mechanism adapted to alternately control the movements of said gates, an operating lever for connecting said actuating mechanism to a source of power, means for normally causing said lever to swing when released, and timing mechanism comprising a slidable head having a threaded segment at one side thereof, a worm connected to a source of power and adapted to engage said segment to slide said head whereby said lever will be periodically released.

5. In a machine for treating grain and the like, timing mechanism for controlling the operation of the feed and discharge gates comprising a worm adapted to be connected to a source of power, a slidable head controlling the actuating mechanism for said gates and having a threaded segment thereon normally engaging said worm, means for disengaging said worm and head when said head has been moved a definite distance, and means for returning said head and reengaging said worm and segment.

6. The structure set forth in claim 5, and adjustable means for limiting the travel of said head.

7. A machine for the treatment of grain and the like, having in combination a treating chamber, an intake passage and a discharge passage communicating with said chamber, a gate in each of said passages, a revoluble member adapted to be periodically driven through a single revolution, means operatively connected to said revoluble member for opening and closing said discharge gate during a portion of said revolution, and a cam mechanism on said member adapted to reciprocate said intake gate during a different portion of said revolution.

8. A machine for the treatment of grain and the like, having in combination a treating chamber, an intake and a discharge passage communicating with said chamber, a gate in each of said passages, a lever operatively connected to said discharge gate for opening the same, means for periodically releasing said lever, revoluble means for resetting said lever and closing said gate, and means operatively connected to said revoluble means for opening and closing said intake gate shortly after the operation of said discharge gate.

9. A machine for the treatment of grain and the like having in combination a treating chamber, an intake passage and a discharge passage, both communicating therewith, gates adapted to control the flow of material through said passages, a weighted lever adapted to control the movement of one of said gates, releasable means for retaining said lever in normal position with said last mentioned gate closed, means connected with a source of power for moving said last mentioned means in one direction to release said lever, rotary means adapted to operate said other gate, a clutch controllable by said lever for driving said rotary means at predetermined intervals, and means for connecting said rotary means with said gate to reciprocate the same.

In testimony whereof I affix my signature.

WALLACE A. ROGERS.